United States Patent [19]
Alden et al.

[11] Patent Number: 5,894,028
[45] Date of Patent: Apr. 13, 1999

[54] PIZZA SAUCE DISK AND METHOD FOR MAKING SAME

[75] Inventors: Don E. Alden, Hutchinson; Steven C. Seideman, Inman; James C. Bolton, Lindsborg, all of Kans.

[73] Assignee: Doskocil Food Service Company, L.L.C., S. Hutchinson, Kans.

[*] Notice: This patent is subject to a terminal disclaimer.

[21] Appl. No.: 08/958,068

[22] Filed: Oct. 27, 1997

Related U.S. Application Data

[63] Continuation of application No. 08/410,338, Mar. 24, 1995, Pat. No. 5,681,602.

[51] Int. Cl.$^6$ ............................................. A23L 1/06
[52] U.S. Cl. ..................... 426/132; 426/89; 426/90; 426/94; 426/274; 426/290; 426/573; 426/576; 426/577; 426/578
[58] Field of Search ........................... 426/89, 90, 92, 426/94, 104, 132, 274, 290, 573, 575, 576, 577, 578, 589, 582, 275

[56] References Cited

U.S. PATENT DOCUMENTS

| | | |
|---|---|---|
| 3,221,672 | 12/1965 | Falco . |
| 3,358,618 | 12/1967 | Vetta . |
| 3,648,596 | 3/1972 | Zito . |
| 3,725,974 | 4/1973 | Kuhlman . |
| 3,735,692 | 5/1973 | Marchignoni . |
| 3,760,715 | 9/1973 | Grote et al. . |
| 3,892,171 | 7/1975 | Fitch et al. . |
| 4,066,796 | 1/1978 | McKee . |
| 4,112,834 | 9/1978 | Thiry . |
| 4,152,976 | 5/1979 | Kawasaki et al. . |
| 4,159,349 | 6/1979 | Caiello . |
| 4,197,794 | 4/1980 | Raque et al. . |
| 4,276,465 | 6/1981 | Flavio . |
| 4,283,431 | 8/1981 | Giordano et al. . |
| 4,367,243 | 1/1983 | Brummett et al. . |
| 4,416,904 | 11/1983 | Shannon . |
| 4,753,815 | 6/1988 | Kielsmeier . |
| 4,997,670 | 3/1991 | Kielsmeier . |
| 5,009,867 | 4/1991 | Kratochvil . |
| 5,023,096 | 6/1991 | Plochman . |
| 5,063,073 | 11/1991 | Kratochvil . |
| 5,117,749 | 6/1992 | Bakker . |
| 5,121,677 | 6/1992 | LeClaire et al. . |
| 5,243,899 | 9/1993 | Moshier et al. . |
| 5,256,432 | 10/1993 | McDonald . |
| 5,681,602 | 10/1997 | Alden et al. ............... 426/132 |

OTHER PUBLICATIONS

Steen, "For Cheesy Ideas, It's Hard to Top These Pizza Disks", *The Wall Street Journal*, Oct. 26, 1995.

*Primary Examiner*—Lien Tran
*Attorney, Agent, or Firm*—Shook, Hardy & Bacon L.L.P.

[57] ABSTRACT

A pizza sauce disk and a method for making the same are provided. The pizza sauce disk comprises a pizza sauce which includes a heat-reversible gelling agent. When activated, the gelling agent causes the pizza sauce to at least partially congeal at room temperature or below so that it may be retained in place on a non-edible support surface. Upon further cooling, the pizza sauce forms a more complete gel structure which, even after warming to room temperature, allows the disk to be handled as a cohesive mass and placed and repositioned on a pizza crust without tearing, breaking or smearing of the disk. The pizza sauce disk may optionally include cheese and assorted pizza toppings. To form a pizza with the present disk, the disk is removed from the support surface and is combined with a pizza crust shell. The pizza may then be cooked and served.

21 Claims, 2 Drawing Sheets

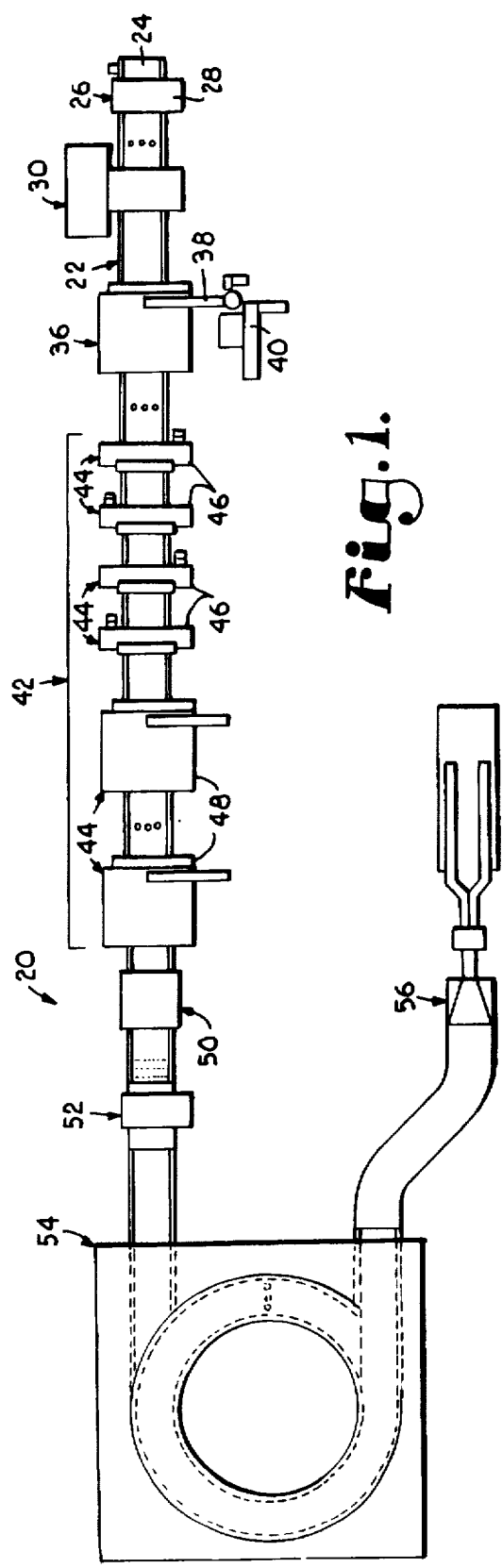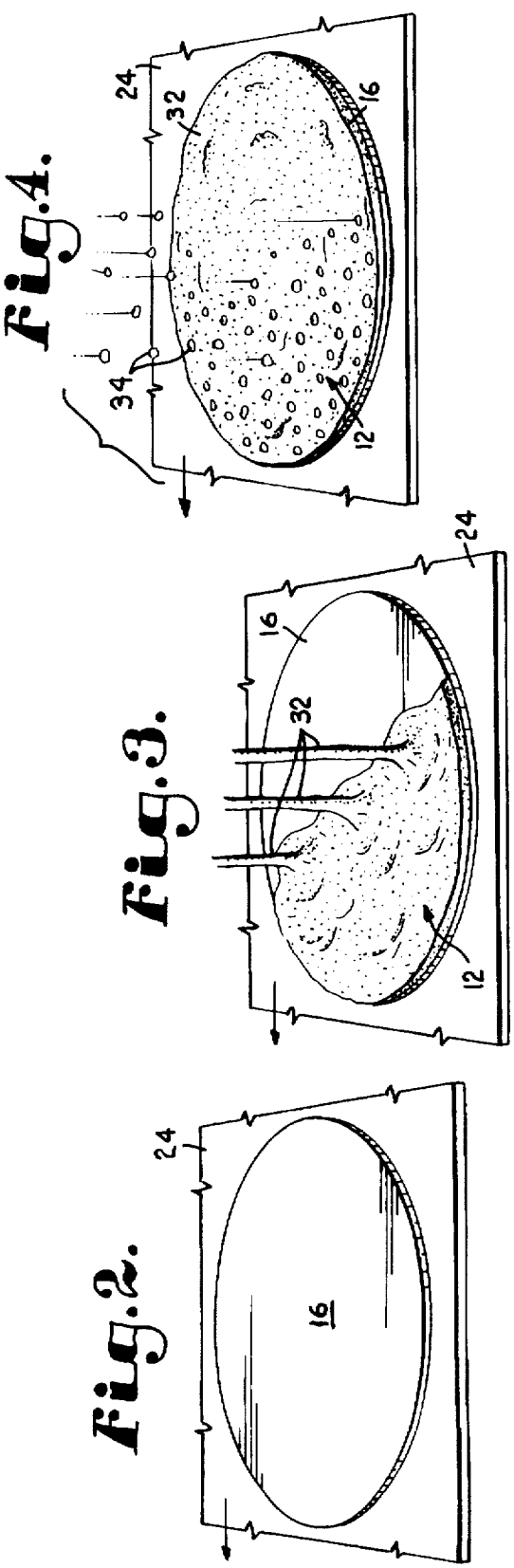

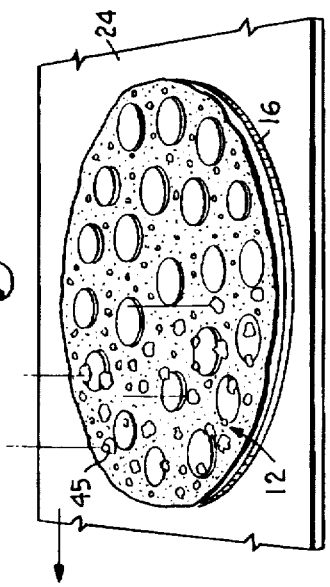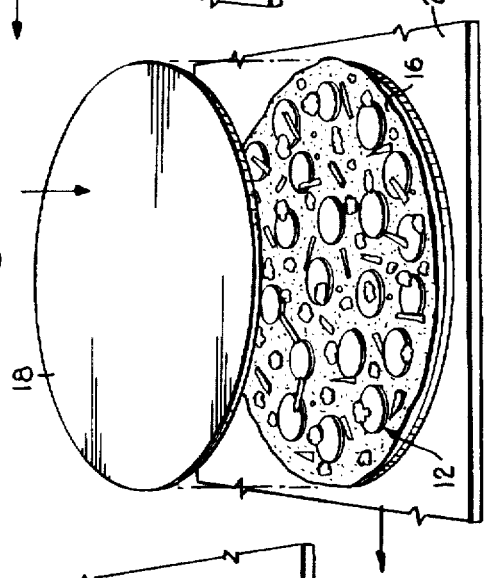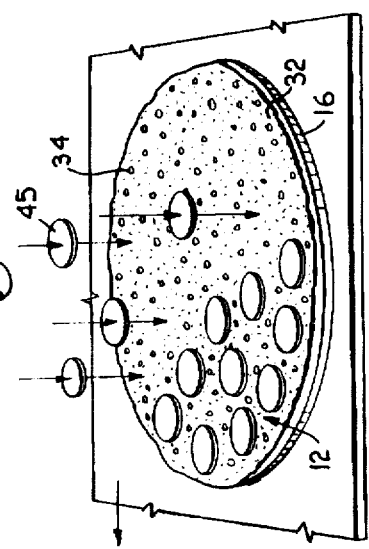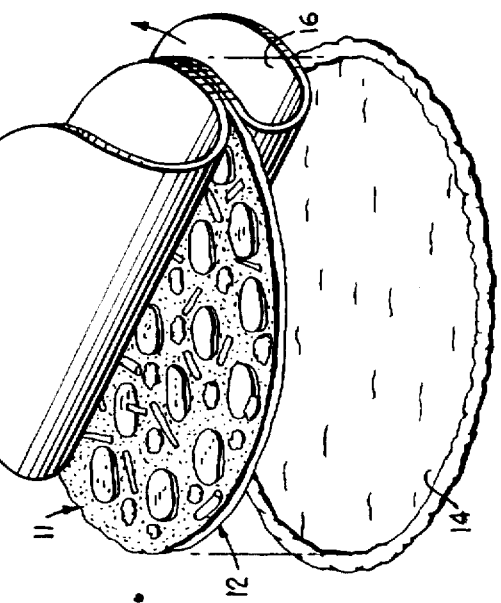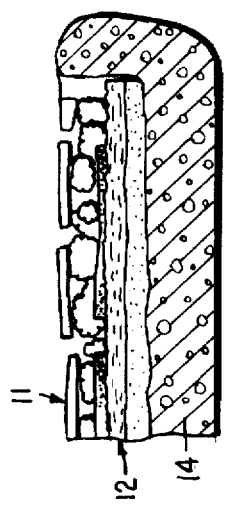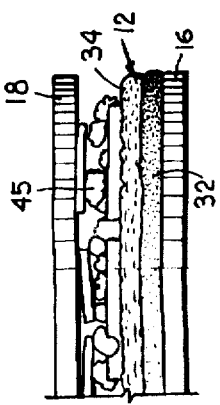

5,894,028

1

PIZZA SAUCE DISK AND METHOD FOR MAKING SAME

This is a continuation of application(s) Ser. No. 08/410,338 filed on Mar. 24, 1995, now U.S. Pat. No. 5,681,602.

BACKGROUND OF THE INVENTION

This invention relates to the field of pizza preparation and, more particularly, to a pizza toppings disk and a method and apparatus for making the disk.

High volume automated systems are available for the mass production of pizzas which are typically frozen for improved shelf life and are sold to consumers through grocery stores. Most restaurants and delivery operations are reluctant to use these types of mass produced pizzas, in part because the freezing of the pizza crust significantly detracts from the flavor of the pizza after cooking. As a result, pizzas served by restaurants and delivery operations are typically prepared manually at the time an order is received. The process of preparing a pizza manually generally involves the sequential steps of forming or providing a crust, spreading a quantity of pizza sauce on the upper surface of the crust, and applying cheese and pizza toppings such as sliced meats and vegetables to the sauce base. As can be readily appreciated, the preparation of pizzas in this manner represents a substantial expenditure in time and effort.

In addition to time considerations, the manual preparation of pizzas is highly inexact. The sauce, cheese and toppings applied to each pizza are usually unmeasured and are quickly applied. This causes a lack of uniformity in the amount of cheese and toppings applied to the pizzas, which results in a reduced ability of restaurants to control and monitor the costs and logistics of production. The lack of uniform distribution of cheese and toppings can also cause the pizza to have an inconsistent flavor and appearance.

Furthermore, the rate and quality of pizza production in restaurants and delivery operations is directly related to the experience of the person who prepares the pizza. Thus, to be most efficient, the restaurant or delivery operation must invest substantial resources in training and supervising individuals in the process of pizza preparation.

Various apparatuses and methods have been heretofore devised to address the problems of time-consumption and inconsistency associated with pizza preparation. For example, U.S. Pat. No. 5,256,432 to McDonald et al. and U.S. Pat. No. 5,243,899 to Moshier et al. disclose a method and apparatus for the automated production of a pizza toppings "disk" which can be subsequently applied to a pizza crust. The toppings disk is formed by mechanically regulating and depositing a quantity of cheese and a plurality of pizza toppings onto a non-edible forming surface rather than a pizza crust. The cheese and pizza toppings are then fused together using heat or other means. The toppings disks can then be frozen and shipped to restaurants or, alternatively, the toppings disks can be prepared at the restaurant location and stored for later use.

A pizza toppings disk is utilized by applying the disk to a pizza crust which has previously been layered with a quantity of pizza sauce. A pizza preparer can thus quickly prepare a pizza by applying pizza sauce to a crust and then selecting the appropriate toppings disk and applying it on top of the pizza sauce. The pizza is then cooked and is ready for serving.

The flavor of a pizza prepared using a pre-made pizza toppings disks can be generally comparable to a freshly made pizza because only the toppings disk and not the pizza crust need be frozen. The use of pizza toppings disks thus provides a significant taste improvement in comparison to most pre-made, frozen pizzas while providing many of the same advantages of reduced preparation time and improved product consistency. Further improvements in the method of making pizzas would nonetheless be desirable. For example, it would be desirable to include the pizza sauce within the toppings disk in order to ensure that uniform amounts of sauce are evenly distributed in the finished pizza and to further reduce the amount of time required to assemble the pizza. However, the flowable nature of the pizza sauce makes it generally unsuited for use in the toppings disk because portions of it would tend to seep out of the disk and/or remain on the forming surface when the disk is removed from the forming surface and applied to the pizza crust.

SUMMARY OF THE INVENTION

It is an object of the present invention to provide a pizza sauce disk and a method and apparatus for making such a disk which further reduce the inefficiencies associated with existing pizza preparation methods.

More specifically, it is an object of this invention to provide a unitary sauce disk which, in one embodiment, need only be combined with a pizza crust to form a pizza.

It is another object of this invention to provide a pizza sauce disk and method of making same using a pizza sauce which has a natural consistency and taste when heated but which at least partially congeals upon cooling to room temperature or below so that the sauce and other optional disk components remain fused together while the disk is being formed, transported and stored.

It is a further object of this invention to provide a pizza sauce as described which is sufficiently cohesive when refrigerated or at room temperature to allow the toppings disk to be pealed off of the forming surface or substrate and applied to the pizza crust without leaving a residue of pizza sauce on the forming surface.

It is a still further object of this invention to provide a pizza sauce as described which is firm but sufficiently elastic when refrigerated or at room temperature to reduce the incidence of tearing or breaking the thin edges of the pizza sauce disk when the disk is being removed from the forming substrate and applied to the pizza crust.

It is a yet further object of this invention to provide a pizza sauce disk having a layer of an at least partially congealable pizza sauce which is readily flowable when heated so that it can be readily applied to and spread over the forming substrate, the heated sauce having the advantageous effect of causing at least partial melting of cheese portions of the disk to further stabilize the disk upon cooling.

To accomplish these and other related objects, the present invention relates to a pizza sauce disk and a method and apparatus for making the disk. The pizza sauce used in the disk includes a heat-reversible gelling agent which allows the sauce to at least partially congeal at preselected temperatures and then melt when heated. Preferably, the pizza sauce at least partially or completely congeals at room temperature or below but retains the consistency it would normally have without the presence of the gelling agent when heated to temperatures above room temperature. Cheese and/or pizza toppings are optionally but preferably included in the disk. Pizza toppings can include meats, vegetables, fruits, spices and combinations thereof.

The disk is formed by applying the pizza sauce and optionally the cheese and/or toppings to a non-edible forming surface such as a silicon coated baker's paper. The pizza sauce is typically heated to cause activation of the gelling agent and is then cooled to allow formation of at least a partial gel structure within the sauce prior to application of the sauce to the forming surface. The gel structure in the pizza sauce facilitates application and retention of the sauce on the forming surface. The sauce, cheese and toppings can be applied to the forming surface in any desired sequence but typically the pizza sauce will either be applied first so that it forms a base layer on the forming surface or last so that it forms a top layer on the previously deposited cheese and/or toppings. As an example, the cheese can be deposited onto the forming surface followed, optionally, by toppings and then the sauce is applied to the cheese and any toppings which are present. The disk can then be subjected to an optional fusing step. A cover sheet is optionally applied to the top of the disk to facilitate separation of the disks when stacked together. To form a pizza with the present disk, the support and cover sheets are removed from the disk and the disk is combined with a pizza crust. The resulting pizza may then be cooked and served.

BRIEF DESCRIPTION OF THE DRAWINGS

In the accompanying drawings which form part of the specification and are to be read in conjunction therewith and in which like reference numerals are used to indicate like components in the various views:

FIG. 1 is a top plan view of an apparatus for making the pizza sauce disk of the present invention;

FIG. 2 is a fragmentary perspective view of a circular sheet which serves as a forming surface for the pizza sauce disk, the sheet being shown on a conveyor belt which forms part of the apparatus shown on a reduced scale in FIG. 1;

FIG. 3 is a fragmentary perspective view similar to FIG. 2 but showing pizza sauce being applied to the circular forming sheet to form a sauce base layer of the disk in accordance with one embodiment of the present invention;

FIG. 4 is a perspective view of the disk of FIG. 3 showing particulate cheese being deposited on the sauce base layer;

FIG. 5 is a perspective of the disk of FIG. 4 showing a toppings layer of sliced pepperoni being deposited on the cheese and sauce base layer;

FIG. 6 is a perspective view of the disk of FIG. 5 showing a toppings layer of vegetables being deposited thereon;

FIG. 7 is a perspective view of one embodiment of a complete pizza sauce disk and showing a cover sheet being applied thereto;

FIG. 8 is an enlarged fragmentary side elevation view of the complete pizza sauce disk of FIG. 7;

FIG. 9 is a perspective view of the pizza sauce disk in the process of having the support and cover sheets removed to permit the disk to be applied to the illustrated pizza crust; and FIG. 10 is an enlarged fragmentary cross-sectional view of the pizza made in accordance with a process and pizza sauce disk of the present invention.

DESCRIPTION OF THE PREFERRED EMBODIMENTS

Turning now to the drawings, and initially to FIGS. 8–10, a pizza made in accordance with the present invention is designated generally by the numeral 11. Pizza 11 comprises a pizza sauce disk 12 and a crust 14 to which the disk 12 is applied. The disk 12 is formed, in the manner described below, on a suitable non-edible forming surface or substrate such as support sheet 16 which can be removed along with an optional cover sheet 18 prior to application of the disk 12 to the pizza crust 14. The pizza 11 may then be cooked and served in a well known and traditional manner which need not be described herein.

Turning now to FIG. 1, an apparatus for producing the pizza sauce disk 12 of the present invention is designated broadly by the numeral 20. In a preferred embodiment, apparatus 20 utilizes a conveyor 22 having a belt 24 which carries the support sheet 16 or other forming surface through a sequence of operational stations to form the pizza sauce disk 12. The initial station of the apparatus 20 comprises a support sheet station 26 which is adapted to place individual support sheets 16 onto the conveyor belt 24 (FIG. 2). The support sheets 16 are preferably maintained in a roll 28, the axis of which lies generally perpendicularly to the longitudinal axis of the conveyor belt 24. Individual support sheets 16 may be separated from the roll 28 by a cutting tool or at preformed perforations. Alternatively, individual support sheets 16 may be provided in a stack or similar orientation. The sheets 16 can be individually dispensed onto conveyor 28 by mechanical means, such as by vacuum, mechanical fingers or adhesive contacts. Preferably, the sheets are dispensed in spaced apart rows with two or more sheets 16 being arranged in side-by-side fashion to form each row.

Support sheets 16 may be formed of any suitable material which is compatible with the components of the pizza sauce disk 12 and resists wetting by and adherence of such components. The upper surface of sheets 16 may be coated with silicon, wax, teflon or other non-stick substances, such as vegetable oil. The sheets 16 can be of various shapes and should also be pliable to facilitate subsequent removal of the sheets 16 from the disk 12. While many materials may be used for sheets 16 without departing from the scope of the invention, sheets 16 constructed of a silicon coated baker's type paper are particularly advantageous because of their resistance to wetting and tearing.

It is to be understood that apparatus 20 may also be operated with other types of non-edible forming surfaces in place of the support sheets 16. By way of example, such operation could be achieved by applying the components of the pizza sauce disk 12 directly to the conveyor belt 24 or by using other types of reusable substrates such as pans. These and other related embodiments are understood to be within the ambit of the present invention.

In the illustrated embodiment, the conveyor belt 24 transports the support sheets 16 to a sauce depositor 30 which is used to apply a pizza sauce 32 of the present invention directly on the support sheets 16 as shown in FIG. 3. It is to be understood that in other embodiments of apparatus 20 the pizza sauce 32 may be applied on top of other optional components of the pizza sauce disk 12 which are deposited onto support sheets 16 prior to application of the pizza sauce. The sauce depositor 30 can be of any suitable and commercially available type which is capable of uniformly depositing a metered quantity of sauce 32 onto each sheet 16.

The pizza sauce 32 which is utilized in the pizza sauce disk 12 is typically of a tomato base and includes various seasonings. In accordance with the present invention, the pizza sauce includes an edible heat-reversible gelling agent which causes partial or complete gelling of the pizza sauce 32 below a preselected temperature and allows melting of the gel structure when the pizza sauce is heated. Preferably, the pizza sauce 32 becomes sufficiently congealed at room temperature so that it does not flow off of the support sheet 16. Upon refrigeration, the pizza sauce 32 can form a more complete gel structure which is retained even after the sauce is removed from refrigeration to allow the pizza sauce 32 to be readily removed from the support sheet as a unitary mass and transferred to the pizza crust 14 during preparation of pizza 11. The gel structure within the pizza sauce 32 should then melt when the pizza sauce is warmed or heated to a temperature above room temperature, thereby returning the pizza sauce to the texture and consistency it would normally have if the gelling agent were not present. Advantageously, the gelling agent allows the pizza sauce 32 to congeal for handling purposes but the gelling agent is not detectable by the consumer when the pizza sauce is heated.

The gelling agent used in the pizza sauce can be selected from any of various suitable substances such as proteins, gums, polysaccharides, starches and the like which will cause formation of a heat-reversible gel structure within the pizza sauce. The gelling agent should disperse readily in the pizza sauce to form a substantially uniform solution and, when activated, should produce the desired consistency and forming strength in the resulting pizza sauce 32. Activation of the gelling agent is typically achieved by heating the solution of sauce and gelling agent to the melting point of the gelling agent and then cooling the solution to the set point of the gelling agent. Other gelling agents are activated by simply adding an activator such as metal ions or acid to the solution of sauce and gelling agent.

Examples of suitable gelling agents which can be used in the pizza sauce 32 include but are not limited to gelatin, starch, alginate, pectin, carrageenan, agar and methylcellulose and combinations thereof. Combination of some types of gums such as xanthan and Locust bean gum can also be used as the gelling agent.

In a typical process, the gelling agent is mixed with the tomato based sauce in suitable amounts and the mixture is heated to the melt point of the gelling agent to cause activatation thereof. The heated sauce mixture is then cooled to a suitable temperature to allow formation of an at least partial gel structure within the sauce 32 so that it may be applied to and remain on sheets 16 to form disk 12. A more complete gel structure is then formed in sauce 32 by further cooling to temperatures above the freezing temperature of the sauce. Once the desired gel structure has been achieved, the disk 12 may be frozen for extended shelf life if desired. Prior to preparation of pizza 11, the disk 12 may be warmed and still retain sufficient gel structure to facilitate removal of the disk 12 from sheets 16 and 18 and placement of the disk 12 on the pizza crust 14.

Gelatin is the preferred gelling agent used in pizza sauce 32. As but one example, it has been determined that addition of 2 to 5% by weight of a 150 to 300 Bloom strength gelatin, and more preferably a 200 to 300 Bloom strength gelatin, to the pizza sauce produces a sauce which forms a highly elastic gel at room temperature and has other desired properties. The gelatin is mixed with the sauce and the mixture is heated to approximately 160° F. to cause activation of the gelatin. The sauce mixture is then cooled to allow an incomplete gel structure to form within the sauce. When the sauce 32 reaches a temperature within the range of 70 to 80° F., it is partially congealed but still sufficiently workable so that it can be deposited on the support sheet 16 along with other optional components to form disk 12. Once the sauce 32 has been placed on the sheet 16, it is then further cooled to approximately 35 to 45° F. to allow formation of a more complete gel structure. The disk 12 may then be frozen if desired or simply refrigerated until used. The disk 12 may be warmed to or slightly below room temperature prior to use in preparation of pizza 11. Although the gel structure softens at room temperature, it retains sufficient cohesiveness to allow handling of the disk 12 and placement on the pizza crust 14 after removal of the support and cover sheets 16 and 18. The gel structure then completely melts at temperatures within the range of approximately 85 to 90° F.

It is to be understood that the pizza sauce 32 can be prepared using various other amounts and types of gelling agents. The temperatures at which partial and complete gelling and melting occur can be varied as well to suit particular applications. For example, in certain instances it may be desirable to prepare a pizza sauce in which gelling does not occur until the sauce is cooled to a temperature below room temperature. The gel structure of such a sauce would then melt at room temperature. A disk 12 having sauce with these characteristics would require refrigeration until it is applied to the pizza crust 14 to ensure that the disk can be handled and separated from the support and cover sheets 16 and 18. The resulting pizza 11, however, could be consumed at room temperature with no detectable difference in the consistency of the sauce 32 due to the presence of the gelling agent. It can thus be appreciated that the many variations of the pizza sauce disk 12 are possible and are within the scope of the present invention.

By way of further example and without intending to be limited, the pizza sauce 32 should form a gel which has a medium hardness, low to medium brittleness and medium to high elasticity as compared to other gels and measured using an instrument such as an Instron model 4201. The hardness of the gel is measured by determining the force required to cause rupture of the gel during compression. Brittleness is a measure of the amount the gel can be squeezed before it breaks and elasticity is a measure of the amount the gel springs back after being squeezed.

Turning additionally to FIG. 4, a layer of cheese 34 may be applied to sauce 32, the support sheets 16 or other components of disk 12 at a cheese depositing station 36. Station 36 includes one or more depositor mechanisms 38 well known to those skilled in the art for applying a predetermined quantity of cheese onto sauce layer 32 in a uniform distribution. More than one type of cheese may be applied at station 36 and a reduction mechanism 40 may be provided for breaking down bulk cheese to a more manageable form prior to application. Reduction mechanism 40 may include a grinder, grater, cuber, shredder or liquefier that prepares cheese for feeding to the depositor mechanism 38. It is to be understood, however, that station 36 may also be operated with pre-reduced cheese, thus obviating the need for mechanism 40.

The disk 12 forming apparatus 20 can also include a toppings station 42 which comprises one or more toppings dispensing units 44, which deposit various pizza toppings 45 on top of the cheese 34 as illustrated in FIGS. 5 and 6. Alternatively, the toppings 45 could be applied directly on the support sheets 16 or, less preferably, on the cheese 34. Assorted toppings 45 such as meats, vegetables, fruits and spices may be added to the disk 12 by the toppings dispensing units 44 individually or in combination, depending on the variety of pizza to be produced. Toppings such as meats and certain vegetables may be precooked or raw.

Slicing units 46 may be utilized at toppings station 42 to deposit toppings 45 from bulk supplies, such as pepperoni and sausage logs or whole vegetables. In addition, particulate depositing units 48 may be employed to deposit reduced toppings 45 such as ground meats, diced vegetables and the like. Variations in the number and arrangement of dispensing units 44 within the toppings station 42 are contemplated and are, thus, within the ambit of the present invention.

Following application of the cheese 34 and toppings 45 to the pizza sauce 32 to form disk 12, the conveyor 22 conveys the disk to an optional fusing station 50 which employs heat to at least partially melt the cheese 34 to further fuse together the various components of the disk 12. Heat may be applied by any conventional chemical or mechanical methods, such as by radiation, electromagnetic waves, convection, physical contact with a heated element and the like. An infrared heat source is preferably used.

The fusing station 50 may of course be unnecessary, including in those instances where the pizza sauce 32 is itself capable of causing the disk 12 components to be fused into a unitary mass. For example, the sauce 32 may be heated prior to application to the support sheet 16 and heat transfer between the sauce 32 and cheese 34 may be sufficient to cause at least partial melting of the cheese 34. As another example, the gel structure of the congealed pizza sauce 32 may be sufficient by itself to bind the cheese 34 and toppings 45. Furthermore, the fusing station 50 is not needed in those instances where the disk 12 consists of pizza sauce 32 without cheese 34 or toppings 45.

It is also to be understood that the sequential positioning of the various operational stations of the apparatus 20 may be varied as desired. Thus, the toppings 45 could first be deposited on the support sheet 16 following by application of the cheese 34. The fusing station 50 could then be utilized to cause melting and fusing of the cheese 34 to the underlying toppings 45. In this presently preferred embodiment, the pizza sauce 32 could then be deposited on the already fused cheese 34 and toppings 45 to complete the disk 12.

Turning additionally to FIG. 7, cover sheets 18 can be applied to the upper surface of the pizza sauce disk 12 at station 52. The cover sheet station 52 is preferably similar in construction and operation to support sheet station 26 but may be modified as needed. The cover sheets 18 may be constructed of the same material as the support sheets 16, but may also be in the form of cellophane wrap substantially completely surrounding the disk 12.

The pizza sauce disks 12 are next conveyed to a cooling station 54 which includes a refrigerator or freezer unit which serves to cool the disks 12, thereby expediting formation of the gel structure within sauce 32. Cooling station 54 may employ any suitable means, such as a spiral freezer, for cooling the disks 12 to the desired temperature. Preferably, the disks 12 are not frozen until the degree of gel formation has been achieved.

A receiving station 56 is utilized for collecting and organizing the cooled or frozen disks 12. Collating, stacking and/or packaging mechanisms may be employed at receiving station 56 to prepare the disks 12 for shipping. Receiving station 56 may also include a dock area for the manual handling of the completed disks 12, either in conjunction with or to the exclusion of automated means. It is to be understood that other related receiving means may also be employed in connection with apparatus 20.

The operation of the various stations of apparatus 20 may be controlled manually by one or more operators or by an automated controller (not shown). The automated controller may include a hard-wired logic circuit, a microprocessor or other equivalent means for activating and deactivating the above-described stations and conveyor at predetermined times. Whether by manual or automated control, it is to be understood that the quantities and combinations of sauce and toppings may be coordinated according to the type of pizza sauce disk 12 to be produced.

In operation, support sheets 16 are consecutively dispensed at station 26 onto conveyor 22. When sheets 16 arrive at pizza sauce depositor 30, a predetermined quantity of pizza sauce 32, which contains a selected amount of gelling agent, is applied to each support sheet 16, thereby forming a base layer of sauce. The sheets 16 containing sauce 32 are then conveyed to the cheese applying station 36 where a quantity of selected cheese is deposited on the sauce 32 by cheese depositors 38. The sheets 16 are next conveyed through toppings dispensing units 44 where selected toppings 45 are dispensed onto the cheese. For example, if pepperoni pizza is to be formed, only the pepperoni slicing unit 48 will be activated to dispense sliced pepperoni onto the cheese 34.

The sheets 16 containing the sauce 32, cheese 34 and toppings 45 are then indexed by conveyor 22 to the fusing station 50 where the cheese 34 begins to melt, thereby fusing the cheese with the toppings 45 and the sauce 32 to form the pizza sauce disk 12. Cover sheets 18 are then dispensed onto the individual disks 12 and the disks 12 is indexed to the cooling station 54. The cooled disks 12 are next conveyed to the receiving station 56 where they may be organized, packaged and prepared for shipping.

It is to be understood that the function of each individual station of apparatus 20 may be performed manually. It is further envisioned that the stations of apparatus 20 could be displaced by individuals organized in assembly line fashion and positioned along conveyor 22 with specified duties relating to production of the subject disk 12. Alternatively, and particularly in the case of domestic production, each function of the stations can be performed by a single individual at a single location, such as in a kitchen. These and related manual variations of apparatus 20 are within the scope of the present invention.

The pizza sauce disk 12 assembled by apparatus 20 or by the manual variations discussed above may also be produced in a different order than described above. For example, as is presently preferred, the disks 12 may be assembled inversely wherein the toppings 45 are initially placed on support sheets 16. The cheese 34 is then deposited on the toppings 45 followed by application of heat to cause fusion of the cheese 34 to the toppings 45. The pizza sauce 32 is then applied on top of the cheese 34 to complete the disk 12. Of course, in those instances where the disk 12 does not include either or both cheese 34 and toppings 45, the process will be varied accordingly. Thus, if toppings 45 are omitted, the sauce 32 is applied on top of the cheese 34 which has been placed on support sheets 16.

During shipping and storage, the completed disks 12 should be refrigerated or frozen to increase shelf life and to decrease the likelihood of contamination and spoilage. Because certain toppings applied to disk 12 may be perishable, it is important to keep the completed disk 12 refrigerated or frozen upon exit from cooling station 54.

In use on site, the pizza sauce disk 12 can be easily and quickly applied to pizza crust 14 to form pizza 11. The crust 14 may be prefabricated or may be made from scratch generally in an appropriate size and shape to receive pizza sauce disk 12. When a pizza order is received, the appropriate disk 12 is selected from storage and is separated from the cover sheet 16 and support sheet 18, if used. Because of the presence of the gel structure within pizza sauce 32, the disk 12 can be readily handled and removed from the sheets 16 and 18 without tearing the thin edges of the disk 12. The disk 12 can then placed on crust 14 and manipulated as desired without tearing, breaking or smearing the sauce. The resulting pizza 11 is placed within an oven or other suitable cooking appliance and heated or cooked. The cooked pizza 11 may then be served.

The pizza sauce disk 12 of the present invention further reduces the inefficiency and inconsistency with existing pizza preparation. In preparing a pizza with a toppings disk without a sauce layer, as taught in previous methods, the preparer would be required to evenly meter out a selected quantity of pizza sauce onto the crust before application of the toppings disk to the crust. This additional step of applying the pizza sauce decreases the efficiency of the pizza preparation process and increases the potential for waste and inconsistency.

The present pizza sauce disk 12, however, resolves this problem. The incorporation of the pizza sauce 32 directly into the disk eliminates the on-site need for sauce application. When the disk 12 contains pizza sauce 32 but no cheese 34 and/or toppings 45, the disk 12 can be used with a toppings disk of the type described in the McDonald and Moshier patents. Alternatively, the disk 12 can include cheese 34 and/or toppings 45 so that a complete pizza can be prepared by simply placing the disk 12 on the pizza crust 14. Not only does the present disk 12 afford the consumer a delicious pizza prepared to order in less time, but it also improves the efficiency and profits of the restaurant or delivery operation.

From the foregoing, it would seem this invention is one well-adapted to attain all the objectives set forth above together with other advantages which are obvious and inherent to the invention.

It will be understood that certain features and subcombinations are useful and may be employed without reference to other features and subcombinations. This is contemplated by the invention and is within the scope of the claims.

Because many additional embodiments may be made of the invention without departing from its scope, it is to be understood that all matters set forth herein and shown in the accompanying drawings are to be interpreted as illustrative only and not in a limiting sense.

We claim:

1. A self-sustaining pizza sauce composite preform on a non-edible forming surface and adapted to be combined with a crust to form a pizza, said composite preform comprising:
   a first layer of cheese applied directly onto the non-edible forming surface;
   a second layer of pizza toppings selected from the group consisting of meats, vegetables and fruits applied on top of said layer of cheese; and
   a third layer of pizza sauce formed by pouring the pizza sauce in flowable form directly onto the layer of toppings, said layer of pizza sauce having an at least partial gel structure while on the layer of toppings resulting from the presence of a heat-reversible gelling agent in the pizza sauce, said layers of cheese and pizza toppings being at least partially fused to the pizza sauce while the layer of cheese is directly on the non-edible forming surface.

2. The pizza sauce composite preform as set forth in claim 1, wherein said gelling agent is selected from the group consisting of proteins, gums, polysaccharides, and starches.

3. The pizza sauce composite preform as set forth in claim 1, wherein said gelling agent is selected from the group consisting of gelatin, starch, alginate, pectin, carrageenan, agar and methylcellulose.

4. The pizza sauce composite preform as set forth in claim 1, wherein said gelling agent comprises gelatin.

5. A self-sustaining pizza sauce composite preform on a non-edible forming surface and adapted to be combined with a crust to form a pizza, said composite preform comprising:
   a first layer of cheese applied directly onto the non-edible forming surface; and
   a second layer of pizza sauce formed by pouring the pizza sauce in flowable form directly onto the layer of cheese, said layer of pizza sauce having an at least partial gel structure while on the layer of cheese resulting from the presence of a heat-reversible gelling agent in the pizza sauce, said layer of cheese being at least partially fused to the pizza sauce while the layer of cheese is directly on the non-edible forming surface.

6. The pizza sauce composite preform as set forth in claim 5, wherein said gelling agent is selected from the group consisting of proteins, gums, polysaccharides, and starches.

7. The pizza sauce composite preform as set forth in claim 5, wherein said gelling agent is selected from the group consisting of gelatin, starch, alginate, pectin, carrageenan, agar and methylcellulose.

8. The pizza sauce composite preform as set forth in claim 5, wherein said gelling agent is gelatin.

9. A method of preparing a self-sustaining pizza sauce composite preform adapted to be combined with a crust to form a pizza, said method comprising:
   applying a layer of cheese directly to a non-edible forming surface;
   pouring a layer of flowable pizza sauce containing a heat-reversible gelling agent onto the layer of cheese;
   activating said gelling agent either prior to or after said pouring of the pizza sauce onto the layer of cheese;
   at least partially fusing the layer of cheese and the layer of pizza sauce by heat while the layers are directly on the non-edible forming surface to form a unitary mass; and
   cooling said fused pizza sauce and cheese layers to cause the activated gelling agent to form an at least partial gel structure and to form said composite preform directly on the non-edible forming surface.

10. The method as set forth in claim 9, wherein said step of activating the gelling agent comprises heating the pizza sauce to the melting point of the gelling agent.

11. The method as set forth in claim 10, wherein said pizza sauce is cooled to form the at least partial gel structure prior to application of the pizza sauce to the layer of cheese.

12. The method as set forth in claim 10, wherein said pizza sauce is cooled to form the at least partial gel structure following pouring of the pizza sauce onto the layer of cheese.

13. The method as set forth in claim 10, including the step of freezing the pizza sauce composite preform.

14. A method of preparing a self-sustaining pizza sauce composite preform adapted to be combined with a crust to form a pizza, said method comprising:
   pouring a layer of flowable pizza sauce containing a heat-reversible gelling agent directly onto a non-edible forming surface;
   activating said gelling agent either prior to or after said pouring of the pizza sauce onto the non-edible forming surface;
   applying a layer of cheese to the layer of pizza sauce on the non-edible forming surface;
   at least partially fusing the layer of cheese and the layer of pizza sauce by heat while the layers are directly on the non-edible forming surface to form a unitary mass; and cooling said fused pizza sauce and cheese layers to cause the activated gelling agent to form an at least partial gel structure and to form said composite preform directly on the non-edible forming surface.

15. The method as set forth in claim 14, wherein said step of activating the gelling agent comprises heating the pizza sauce to the melting point of the gelling agent.

16. The method as set forth in claim 15, including the step of freezing the pizza sauce composite preform.

17. A method of preparing a self-sustaining pizza sauce composite preform adapted to be combined with a crust to form pizza, said method comprising:

applying a layer of cheese directly to a non-edible support surface;

applying a layer of toppings selected from the group consisting of meats, vegetables and fruits to the layer of cheese;

pouring a layer of flowable pizza sauce containing a heat-reversible gelling agent on top of said layers of cheese and toppings;

activating said gelling agent either prior to or after said pouring of the layer of pizza sauce on the layers of cheese and toppings;

at least partially fusing together said layer of toppings, layer of cheese and layer of pizza sauce by heat while the layers are directly on the non-edible forming surface to form a unitary mass; and cooling said fused pizza sauce, cheese and toppings layers to cause the activated gelling agent to form an at least partial gel structure and to form said composite preform directly on the non-edible forming surface.

18. The method as set forth in claim 17, wherein said step of activating the gelling agent comprises heating the pizza sauce to the melting point of the gelling agent.

19. The method as set forth in claim 18, including the step of freezing the pizza sauce composite preform.

20. The method as set forth in claim 17, including the step of at least partially melting said cheese to further bind together the pizza sauce, cheese and toppings.

21. The method as set forth in claim 17, including the step of at least partially melting said cheese prior to said pouring of the pizza sauce.

* * * * *